United States Patent
Madou et al.

(10) Patent No.: US 10,210,335 B2
(45) Date of Patent: *Feb. 19, 2019

(54) APPLICATION SECURITY TESTING

(75) Inventors: Matias Madou, Lichtervelde (BE);
Kirill Mendelev, Atlanta, GA (US);
Sam Ng Ming Sum, Hong Kong (CN)

(73) Assignee: Entit Software LLC, Sunnyvale, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/397,988

(22) PCT Filed: Jul. 26, 2012

(86) PCT No.: PCT/US2012/048350
§ 371 (c)(1),
(2), (4) Date: Oct. 30, 2014

(87) PCT Pub. No.: WO2014/018042
PCT Pub. Date: Jan. 30, 2014

(65) Prior Publication Data
US 2015/0248558 A1    Sep. 3, 2015

(51) Int. Cl.
*G06F 21/57* (2013.01)
*G06F 11/36* (2006.01)

(52) U.S. Cl.
CPC ........ *G06F 21/577* (2013.01); *G06F 11/3688* (2013.01); *G06F 2221/033* (2013.01)

(58) Field of Classification Search
CPC .................... G06F 21/577; G06F 2221/033
USPC ....... 726/5, 25; 717/128, 129, 131, 134, 135
See application file for complete search history.

(56) References Cited

U.S. PATENT DOCUMENTS

| | | | |
|---|---|---|---|
| 7,401,322 B1 | 7/2008 | Shagam et al. | |
| 7,721,154 B1 | 5/2010 | Jaamour et al. | |
| 7,975,296 B2 | 7/2011 | Apfelbaum et al. | |
| 8,613,080 B2 * | 12/2013 | Wysopal | G06F 11/3612 726/19 |
| 2003/0131283 A1 * | 7/2003 | Ur | G06F 11/3632 714/36 |
| 2006/0225051 A1 | 10/2006 | Kannan | |
| 2006/0242466 A1 | 10/2006 | Tillmann et al. | |
| 2008/0259993 A1 | 10/2008 | Blakeley | |
| 2008/0263671 A1 | 10/2008 | Solino Testa et al. | |
| 2009/0100518 A1 | 4/2009 | Overcash | |
| 2009/0259993 A1 | 10/2009 | Konduri et al. | |
| 2010/0083240 A1 | 4/2010 | Siman | |
| 2010/0153866 A1 | 6/2010 | Sharoni | |

(Continued)

FOREIGN PATENT DOCUMENTS

CN    101183315 A    5/2008

OTHER PUBLICATIONS

Daniel F et al, Active Rules for Runtime Adaptivity Management, <http://ceur-ws.org/Vol-267/paper3.pdf >, Retrieved on Jul. 27, 2012.

(Continued)

*Primary Examiner* — Ashok Patel
*Assistant Examiner* — William B Jones (57) ABSTRACT

Example embodiments disclosed herein relate to actively modify execution at runtime of an application under test (AUT). The AUT is executed using a real-time modifier. A security test is performed on the AUT. Execution of the AUT is modified at a decision point.

17 Claims, 5 Drawing Sheets

(56) References Cited

U.S. PATENT DOCUMENTS

| | | | |
|---|---|---|---|
| 2011/0173600 A1 | 7/2011 | Thompson | |
| 2011/0208716 A1* | 8/2011 | Liu .................... | G06F 17/30247 707/710 |
| 2011/0302566 A1* | 12/2011 | Abadi .................... | G06F 21/577 717/168 |
| 2012/0072968 A1* | 3/2012 | Wysopal ............. | G06F 11/3612 726/1 |
| 2012/0131556 A1* | 5/2012 | Mathur ............... | G06F 11/3664 717/125 |
| 2012/0222014 A1* | 8/2012 | Peretz ................. | G06F 11/3688 717/125 |
| 2014/0082739 A1* | 3/2014 | Chess .................. | G06F 21/577 726/25 |

OTHER PUBLICATIONS

International Search Report and Written Opinion received in related PCT Application No. PCT/US2012/048350, dated Jan. 31, 2013, 10 pages.

Disclosed Anonymously, Method to improve code coverage and repeatability by overriding compiler logic with pseudo-random decisions, Jan. 18, 2012, IP.Com Journal, IP. Com Inc., IP.com No. IPCOM000214219, 4 pages.

Supplementary European Search Report, European Patent Application No. 12881886.1, Jan. 7, 2016, 6 pages.

Tikir, M.M., et al., Efficient Instrumentation for Code Coverage Testing, University of Maryland, Software Engineering Notes, Jul. 1, 2002, vol. 27, No. 4, pp. 86-96.

* cited by examiner

APPLICATION SECURITY TESTING

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making HTTP requests and evaluating the HTTP responses or the lack thereof in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses. In a black-box approach, the scanner does not have any insight into the internal workings of the AUT.

BRIEF DESCRIPTION OF THE DRAWINGS

The following detailed description references the drawings, wherein.

DETAILED DESCRIPTION

Embodiments described herein provide techniques for performing testing of applications, such as web applications. When a company desires to know how secure a web application the company has in production is or going to be put into production, the company often uses a security testing solution such as a penetration testing solution (e.g., use of a scanner), fuzz testing, vulnerability testing, software security testing, website security testing, combinations thereof, or the like. The company may wish to use a copy of the application in production as an Application Under Test (AUT). A reason to use an application in production or an application that is going to be put into production for testing is that the company may desire to test the same code in a manner that modifications to the AUT are not allowed. Using an AUT that is going to be the application in production at a quality assurance stage ensures that the application used in production has been tested.

However, features in the application itself may prevent the security testing solution from performing an in-depth analysis of the AUT. For example, Completely Automated Public Turing test to tell Computers and Humans Apart (CAPTCHA), identification validation, credit card validation, username and password authentication, login authentication, or other mechanisms may prevent portions of the AUT from being accessed by an automatic tool. In this scenario, the application can reject attempts to introduce malicious payload into previously observed Hypertext Transfer Protocol (HTTP) requests, which is a standard practice during automatic web application security testing.

In the security testing world, there can be more actual vulnerabilities that are found when attacking an AUT. Accordingly, various embodiments disclosed herein relate to modifying, in real time, the AUT in response to a security test. A real-time modifier can be introduced that will not make changes to the code compiled, but will change the behavior of the program during execution. The AUT can be an exact copy of the code running in a production system or for development testing. The real-time modifier can change the behavior on the fly to overcome difficulties that prevent an automated tool like a vulnerability scanner to do an in-depth analysis of the AUT. One example is making sure that a CAPTCHA solver always returns true or passed no matter what the data presented to the CAPTCHA solver is.

In certain examples, the real-time modifier can change data that goes to functions or comes from a function in the AUT to overcome certain difficulties. For example, a page that is hard to access for an automated testing solution can be modified to be easily accessed. This makes a more in-depth analysis of the AUT possible. Further, a company can test the application that is in production without changing the application. Moreover, it can be an automated process that can be easily adopted by the company.

Figure 1:
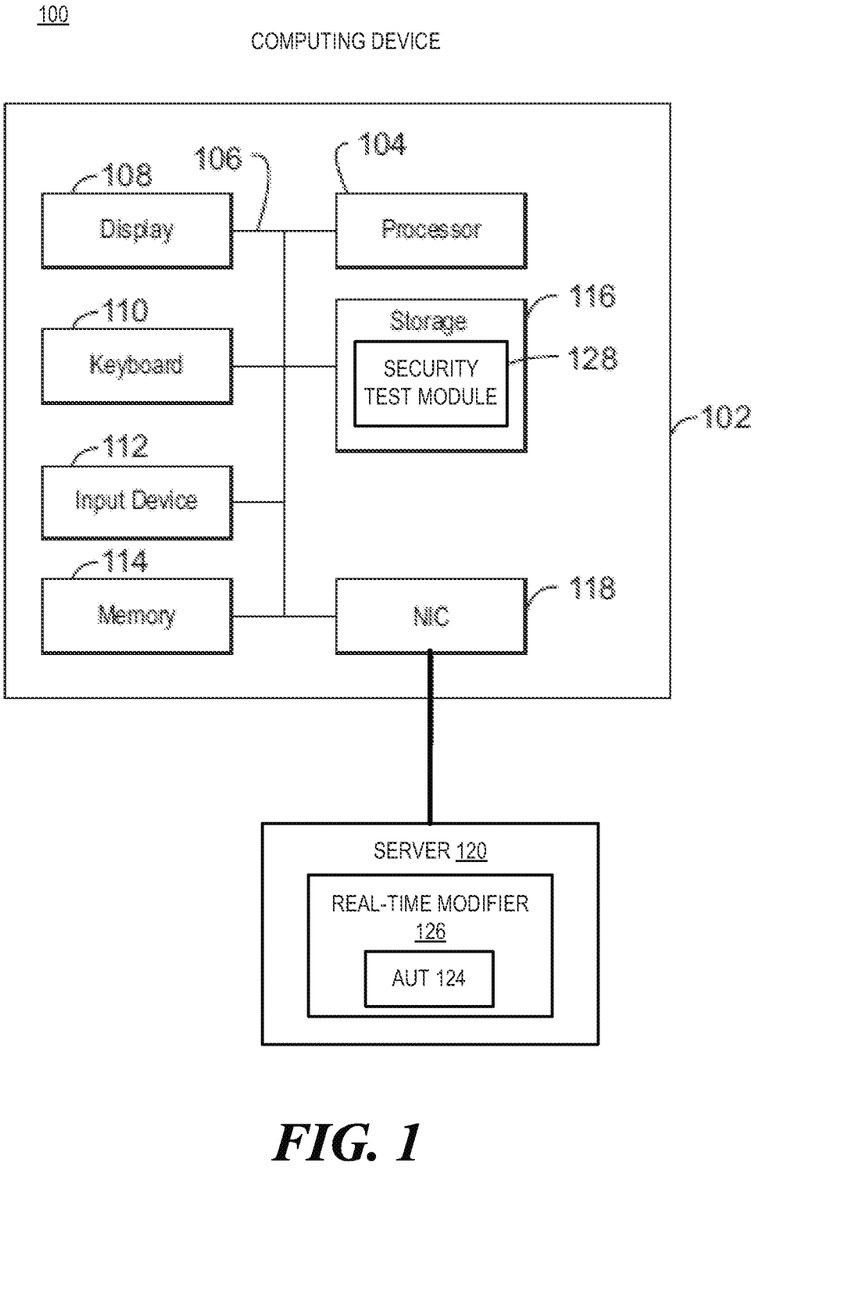
FIG. 1 is a block diagram of a system capable of modifying execution of an application under test in response to a security test, according to one example.

FIG. 1 is a block diagram of a system capable of modifying execution of an application under test in response to a security test, according to one example. The system is generally referred to by the reference number 100. Those of ordinary skill in the art will appreciate that the functional blocks and devices shown in FIG. 1 may comprise hardware elements including circuitry, software elements including computer code stored on a non-transitory, machine-readable medium, or a combination of both hardware and software elements. Further, the configuration is not limited to that shown in FIG. 1, as any number of functional blocks and devices may be used in embodiments of the present invention. Those of ordinary skill in the art would readily be able to define specific functional blocks based on design considerations for a particular electronic device.

As illustrated in FIG. 1, the system 100 may include a computing device 102, which can include a processor 104 connected through a bus 106 to a presentation device such as a display 108, a keyboard 110, and one or more input devices 112, such as a mouse, touch screen, or keyboard. In an embodiment, the computing device 102 is a general-purpose computing device, for example, a desktop computer, laptop computer, server, and the like. The computing device 102 can also have one or more types of non-transitory, computer readable media, such as a memory 114 that may be used during the execution of various operating programs, including operating programs used in embodiments of the present invention. The memory 114 may include read-only memory (ROM), random access memory (RAM), and the like. The computing device 102 can also include other non-transitory, computer-readable media, such as a storage system 116 for the long-term storage of operating programs and data, including the operating programs and data used in embodiments of the present invention.

In an embodiment, the computing device 102 includes a network interface controller (NIC) 118, for connecting the computing device 102 to a server 120. The computing device 102 may be communicatively coupled to the server 120 through a network, such as the Internet, a local area network (LAN), a wide-area network (WAN), or another network configuration. The server 120 may have a non-transitory, computer-readable media, such as storage device, for storing data, buffering communications, and storing operating programs of the server 120. Communications between the computing device 102 and the server 120 may be conducted using a request-response protocol such as the Hyper-Text Transfer Protocol (HTTP) or another application programming interface (API).

The server 120 may be an application server that hosts an AUT 124. The server 120 also includes a real-time modifier 126 that can monitor and/or modify execution of the AUT 124. In certain examples, the real-time modifier 126 acts as an environment for the AUT 124 to execute. The real-time modifier 126 can be implemented using a software framework such as the NET framework, the Java Virtual Machine, or other similar engines. In other examples, aspect oriented programming or other software may be used. In some examples, the server can be implemented as a computing device such as computing device 500, a laptop, a desktop computer, a workstation, or other computing device.

In one example, Java Virtual Machine instrumentation is used. An API Called Instrument can be used to monitor and/or manage APIs that are called. Here, when a particular API or set of APIs is called, the instrument can substitute code, variables, etc. into execution and/or otherwise modify the execution of the AUT 124. For example, if a part of the API is called, code associated with the real-time modifier can be executed to facilitate choosing of a desired path. Similar approaches can be used in other software frameworks such as .NET. Here, the changes can be performed in memory. As such, the AUT 124 need not be modified directly.

In another example, aspect oriented programming features may be used. APIs to be monitored can be specified. At runtime, changes can be implemented on the fly based on programmed settings.

The computing device 102 may include a security test module 128 such as a scanner, fuzzing, vulnerability tester, etc. that performs a security test against the AUT 124. In one example, a vulnerability tester looks for known vulnerabilities in an AUT 124 and reports potential exposures. In another example, a penetration tester or scanner is a test that looks for ways to exploit a normal course of business associated with the AUT 124. In yet another example, fuzz testing can be a technique that involves providing invalid, unexpected, or random data to inputs of an AUT. The AUT 124 can then be monitored for issues.

The security test module 128 may send HTTP requests to the AUT 124 through the network, wherein the HTTP request is configured to attempt to expose a vulnerability of the AUT 124. The HTTP requests may include HTTPS requests, which combine the Hypertext Transfer Protocol with the SSL (Secure Sockets Layer) and TLS (Transport Layer Security) protocols to provide encrypted communication and secure identification of a network Web server.

During the processing of the HTTP request by the AUT 124, an observer (not shown) can monitor the internal processes performed by the AUT 124. For example, the observer can identify lines of code that are executed by the AUT 124, files that are accessed, database queries that are performed, and the like. Both the observer and the AUT 124 may be configured to communicate with the security test module 128 over a same HTTP channel.

Figure 2:
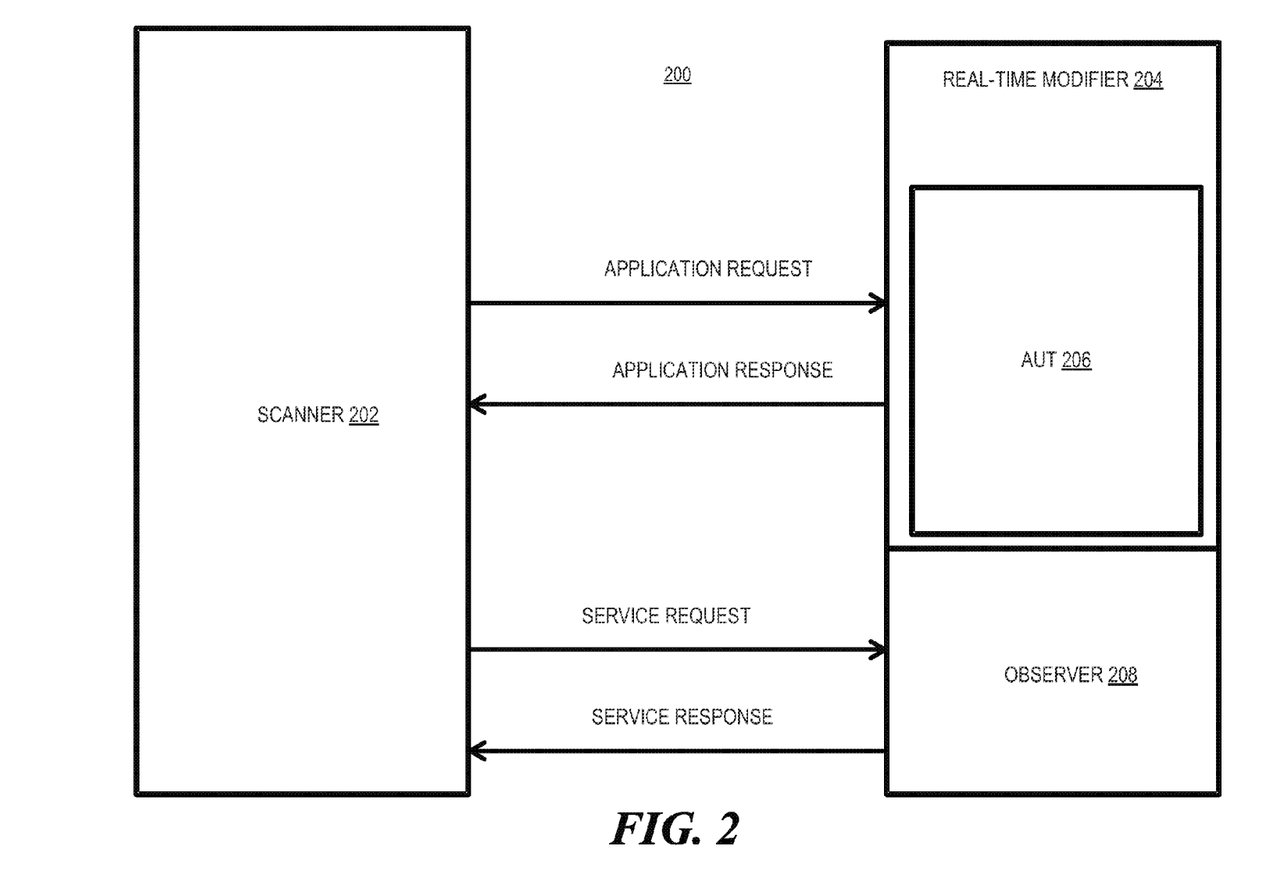
FIG. 2 is a block diagram of showing a testing system configuration capable of modifying execution of an application under test, according to one example.

As described further in reference to FIG. 2, some requests sent from the security test module 128 to the server 120 may target the AUT 124 to elicit a response from the AUT 124 in accordance with its programming. Other requests sent from the security test module 128 to the server 120 may target the observer to obtain additional information regarding the effect that a particular request had on the operations performed by the AUT 124 or other information related to the AUT 124, the observer, or the server 120 hosting the AUT 124. Data received by the security test module 128 in responses to application requests and service requests may be used by the security test module 128 to generate vulnerability reports. Vulnerability reports may be displayed to the user though a user interface provided by the security test module 128.

As noted above, in certain scenarios, vulnerabilities may not be found because the security test module 128 may not be able to get to one or more vulnerabilities because it fails to get past another security test or validation scheme of the AUT 124 and/or server 120. As such, the real-time modifier 126 can modify an execution at runtime of the AUT to take a path at a decision point in response to a communication from the security test module 128. Modification to the execution of the AUT 124 can be made to take the path regardless of a decision made at the decision test by the AUT 124.

In one example, the real-time modifier changes the outcome of a function used by the AUT to pin a decision made at the decision point. For example, the function called could be a CAPTCHA test, validation of an identification number such as a social security number or driver's license number, validation of a credit card number, other validation, other tests, or the like. Validation may take into account a security code on the back of the credit card number or other algorithms.

The decision made can relate to passing of the security validation test. For example, the function outcome and/or decision point can relate to whether the test is passed or failed. Normally, if the test is passed, the test run by the security test module 128 can continue to look for additional vulnerabilities, but if the test does not pass, the security test module 128 is unable to continue. As such, one or more decision points of the AUT 124 can be controlled dynamically by the real-time modifier 126.

In one example, a function (e.g., a function for a CAPTCHA test or validation) can be modified in real-time to return a particular value (e.g., pass). In another example, a variable that is used at a decision point can be controlled. For example, if executing code at the decision point reads a variable to make its decision, the variable may be controlled regardless of a function used to determine the variable and/or information received from the security test module 128.

FIG. 2 is a block diagram of showing a testing system configuration capable of modifying execution of an application under test, according to one example. The system 200 may include a scanner 202, a real-time modifier 204, an AUT 206, and an observer 208.

The AUT 206 may be encoded in any suitable Web-based computer language, such as JAVA, or .NET, among others. The AUT 206 may operate within an suitable software framework, such as Struts, Struts 2, ASP.NET MVC, Oracle WebLogic, and Spring MVC, among others. The software framework includes a set of common code modules that provide generic functionality, which can be selectively overridden or specialized by user code to providing specific functionality. The AUT 206 may be configured to execute one or more instances of a Java Virtual Machine (JVM), Common Language Runtime (CLR), and/or other runtime environment for processing requests from the scanner 202. The programming instructions provided by the common code modules of the software framework or runtime environment may be referred to as container code. The custom programming instructions specific to the AUT 206 may be referred to as user code. During testing, a scanner 202 can explore the AUT 206 by making HTTP requests and evaluating the HTTP responses or the lack thereof in order to find all of the URLs where the AUT accepts input. A lack of response may provide useful information, for example, information to determine that the tested application has failed and/or the server hosting the application has failed. Even though examples discussed herein are directed to a scanner 202, it is contemplated other security testing engines, modules, and/or techniques can be used.

The AUT 206 includes a network interface (not shown) for enabling communications between the scanner 202 and the AUT 206 through the network. The network interface exposes the attack surface of the AUT 206 and is the same interface that would eventually be used to provide access to the AUT 206 when the AUT 206 is made available for general use. Communication between the scanner 202 and the AUT 206 over the network interface may be conducted through application (e.g., via HTTP) requests issued from the scanner 202 to the AUT 206 and HTTP responses issued from the AUT 206 to the scanner 202. Requests targeting the AUT 206 may be referred to as application requests, and responses received from the AUT 206 may be referred to as application responses. The application requests generated by the scanner 202 may be configured to expose potential vulnerabilities of the AUT 206, to respond to tests posed by the AUT 206, or the like.

The real-time modifier 204 and/or observer 208 can operate within the execution environment of the AUT 206 and has access to the internal operations performed by the AUT 206. For example, the real-time modifier 204 may modify the bytecode of the AUT 206 by injecting additional code, such as a JAVA class, at various program points. The injected code acts as a monitor that observes the AUT 206. The injected monitor code may be located at strategic program points in the AUT 206, for example, application programming interface (API) calls that perform specific operations such as performing security validation tests such as CAPTCHA, validation of a credit card number, validation of an identification number, or the like.

Communications between the scanner 202 and the observer 208 may be implemented through the use of custom request and response headers. Custom headers may be added to the application requests by the scanner 202, and custom headers may be added to the application responses by the observer 208. In this way, at least some of the communications between the scanner 202 and the observer 208 may be piggy-backed on normal communications with the AUT 206. Using a single channel of communication eliminates any problems with opening a dedicated, secondary channel, and adding HTTP headers typically does not interfere with the normal operation of the AUT 206.

In one example, the scanner 202 performs a test on the AUT 206. Application requests can be sent to the AUT 206 and application responses can be received. During the test, the AUT 206 may invoke a validation test, such as CAPTCHA, validation of a credit card, validation of an identification number, a user name and password authentication, etc. A message may be sent by the scanner 202 to the AUT 206 for answering the validation. Without the modifier, a wrong answer will prevent the scanner 202 from moving further in the test. As such, the real-time modifier 204 can modify execution of the AUT 206 to take a path in response to the scanner's answer message regardless of whether the answer message would pass the validation test provided by the AUT 206.

If the AUT 206 provided a CAPTCHA image to the scanner 202 to provide an answer for and the scanner responds right, the path is taken. Further, if the scanner 202 responds incorrectly, the path is still taken. Various methods can be used to cause the AUT 206 to take the path. In one example, a first function can control the validation test and return a result as to whether the test was passed. A second function can decide which path to take. In this example, what is returned by the first function can be modified by the real-time modifier 204 to cause the taking of the intended path. In another example, a variable (e.g., a global variable) can be modified by the validation test and be used to control the path. The real-time modifier 204 can modify the variable in real-time, change it at another time to cause the path to be taken, keep the variable from being changed, or a combination thereof. Because the path to continue is taken, the scanner 202 can perform additional testing and may be able to find other vulnerabilities. In certain examples, a multiple tests by the scanner 202 can be run using one or more real-time modifications. As such, a first run may fail at a first validation test (e.g., CAPTCHA) because no modification was made, while a second run may continue to a second validation test (e.g., a credit card validation) but not pass that test. A third run can cause modification of both the first and second validation tests. As such, multiple levels of security can be tested by the scanner 202.

The observer 208 may be used to provide information to the scanner 202 to facilitate testing of the AUT 206. The scanner 202 can communicate with the observer 208 by using service requests and responses. The service requests and responses can be implemented using, for example, custom headers.

In some examples, the real-time modifier 204 can also be used to modify other aspects of the AUT 206 during execution. For example, code for debugging can be added to the execution of the AUT 206 if one or more functions or program segments are dynamically compiled. As such, an on-the-fly compiler can compile code with debug information. With this approach, the observer 208 can have access to detailed information about the executed code. The detailed information can be provided to the scanner 202. The scanner 202 can use the debugging information in its testing of the AUT 206.

Figure 3:
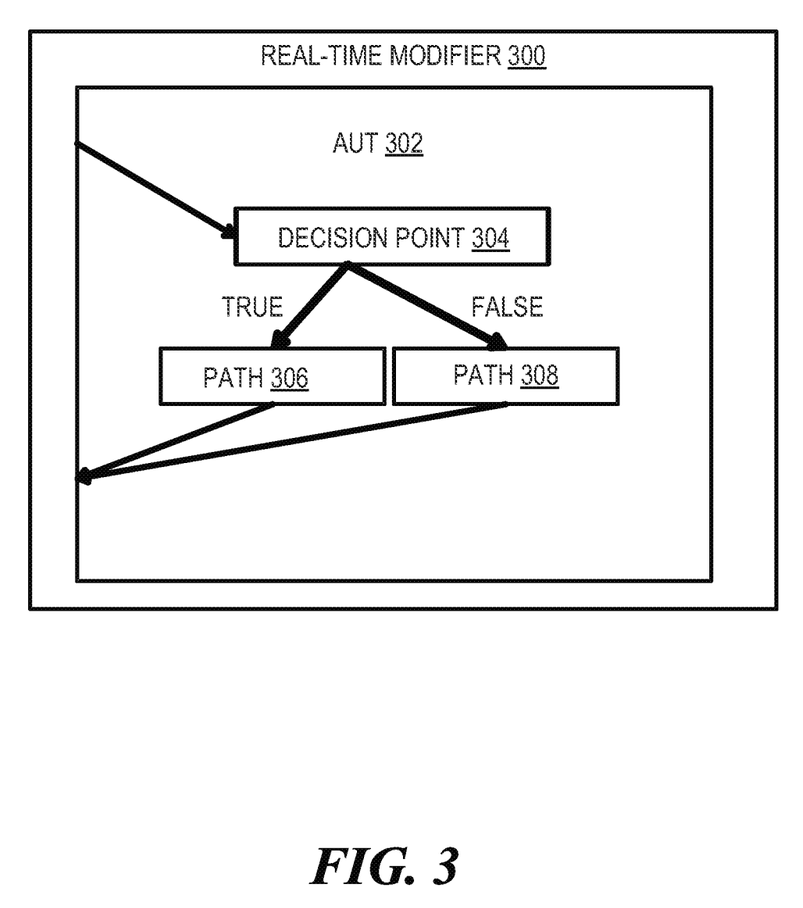
FIG. 3 is a block diagram of showing an example of a decision of an application under test being modified, according to one example.

FIG. 3 is a block diagram of showing an example of a decision of an application under test being modified, according to one example. A real-time modifier 300 can execute an application under test 302. The application can be tested by a security test engine such as a scanner. The AUT 302 can send and receive messages from the security test engine to communicate. Further, the AUT 302 may, via the communications, provide a test such as a validation test. The test can be provided to the security test engine via an API.

During or after the test, a decision point 304 may be reached. In this example, the decision point 304 is binary having a true path 306 and a false path 308. However, it is contemplated that additional paths can be chosen at the decision point 304. The real-time modifier 300 can pin the decision point 304 to a particular path, such as path 306. As noted above, this can occur without regard to whether the test is passed or failed. Further, various approaches can be used for causing the path 306 to be taken. In one example, a variable that the decision point 304 looks at can be modified by the real-time modifier 300 to drive the decision to path 306. In another example, code at the decision point 304 can be modified to drive the decision to path 306. Moreover, the real-time modifier 300 may cause a return value from a function of the test that the decision point 304 looks at to be modified to a value that causes path 306 to be taken. In other scenarios, another path, such as path 308 can be caused to be taken. As noted above, the test provided by the AUT 302 can be a validation test such as CAPTCHA, credit card validation, user authentication, or the like.

The path taken can be a path that provides additional usage of the AUT 302. As such, the security test engine can perform a more in depth test or scan of the AUT 302. Further, the path taken can be in response to information received from the security test engine or other module of a testing device. The received information can be caused by the test provided by the AUT 302. Moreover, in certain scenarios, execution of the AUT 302 is modified in a manner such that no matter what the information received is, the path is taken. This modification can occur each time the decision point 304 is reached or whenever a decision that may be made at the decision point 304 does not lead to the desired path 306. In this case, the real-time modifier 300 can look at the decision made at the decision point 304 and modify execution to take the path 306 if needed.

Figure 4:
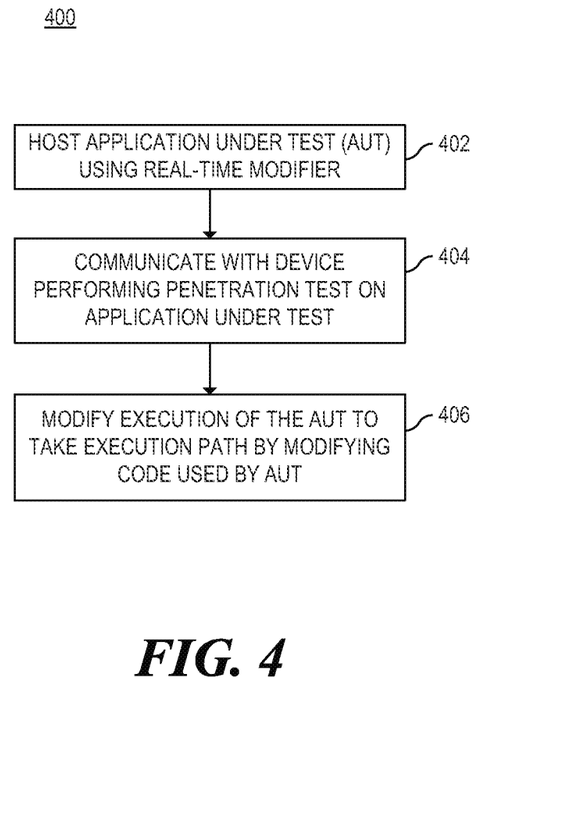
FIG. 4 is a flowchart of a method for modifying execution of an application under test to take an execution path by modifying code used by the application under test, according to one example.

FIG. 4 is a flowchart of a method for modifying execution of an application under test to take an execution path by modifying code used by the application under test, according to one example. Although execution of method 400 is described below with reference to computing system 100, other suitable components for execution of method 400 can be utilized (e.g., computing device 500). Additionally, the components for executing the method 400 may be spread among multiple devices. Method 400 may be implemented in the form of executable instructions stored on a machine-readable storage medium, such as storage medium 520, and/or in the form of electronic circuitry.

At 402, a server 120 can host an AUT 124 using a real-time modifier 126. The server 120 can communicate with other devices and/or programs, for example, via a network. In one example, a security test module 128 can be used to communicate with the AUT 124.

As such, at 404, the server 120 can communicate with a computing device 102 configured to perform a security test on the AUT 124. As noted, the security test can include a unit test, a penetration test, fuzz testing, vulnerability testing, software security testing, website security testing, combinations thereof, or the like.

During the test, the AUT 124 can perform various tasks. Further, the AUT 124 may include security procedures, validation tests, or the like that may stop or otherwise impede the security test. Examples of security procedures include validation tests, CAPTCHA, other authentication, etc. The AUT 124 can ask for a response from the security test module 128 and can receive a response. At 406, the real-time modifier 126 can modify execution of the AUT 124 to take an execution path at a decision point by modifying code used by the AUT 124. The modifying of the code can take place in memory in a manner such that the compiled code of the AUT 124 can be stable.

In one example, the security procedure provided to the security test module 128 is a CAPTCHA security test. The received response can be a correct and/or incorrect response. In the case of a received incorrect response, the execution path associated with a correct response can be taken by the AUT 124 using the real-time modifier. As noted above, various approaches can be used to modify the path to be taken. In one example, modifying of the code can include modifying the outcome of a function. Further, the function can be intended to return the successfulness of the CAPTCHA security test. The function outcome or return value can be used to make the decision.

As noted above, multiple tests can be run by the security test module 128. The tests can reflect varying levels of modification. This can provide a more in depth determination of possible vulnerabilities of the AUT 124. For example, the security test module 128 can determine whether another level of security would hold well to another form of attack if an attacker gets by a CAPTCHA security mechanism, validation, other security mechanisms, or the like.

Figure 5:
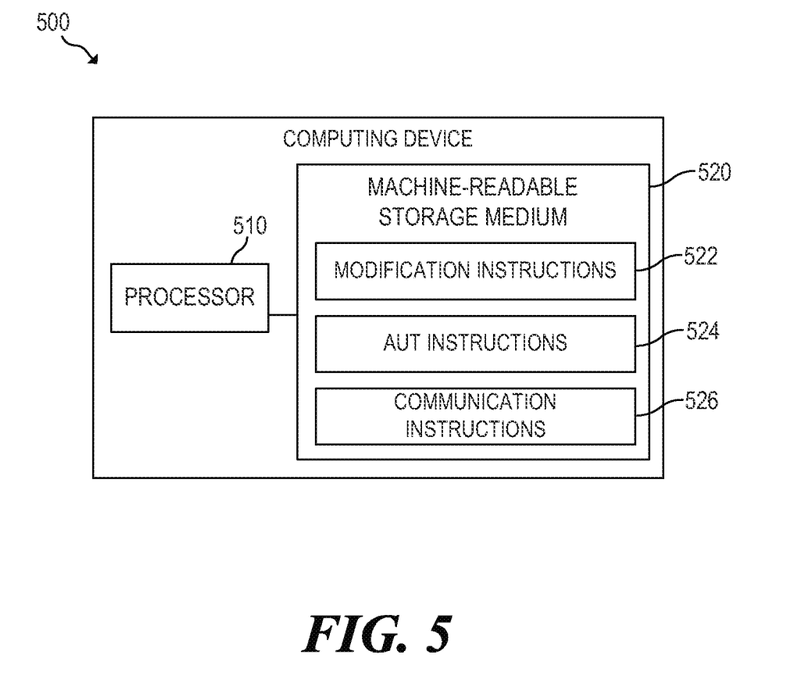
FIG. 5 is a block diagram of a computing device capable of modifying an application under test in response to actions of a security test, according to one example.

FIG. 5 is a block diagram of a computing device capable of modifying an application under test in response to actions of a security test, according to one example. The computing device 500 includes, for example, a processor 510, and a machine-readable storage medium 520 including instructions 522, 524, 526 for modifying execution of an application under test to take a path at a decision point based on a security test initiated at another device. Computing device 500 may be, for example, a notebook computer, a desktop computer, a server, a workstation, or any other computing device. In certain examples, the computing device 500 can be used to implement one or more features of server 120.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement real-time modification of an AUT such as in method 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for modifying an AUT in response to information received during a security test.

AUT instructions 524 can be executed by the processor 510 to host an AUT. The AUT can be executed in a runtime environment that can include a real-time modifier. The AUT 524 can communicate with another computing device via a communication device and communication instructions 526 executing on the processor 510. The other computing device can perform a security test on the AUT.

During the security test, the AUT can implement various security, authentication, or other procedures that may hinder the testing for vulnerabilities in the AUT. Examples of such procedures include security validation tests such as CAPTCHA, validation of a credit card number, validation of an identification number such as a social security number, or the like. To alleviate the hindrance, modification instructions 522 can be executed to modify, in real-time, execution of the AUT to take a path at a decision point based on the security test and a desired path. For example, a desired path from a CAPTCHA test, a credit card validation, etc. could be to continue as if the test was passed. The decision point can be based on the security test because the security test may provide input from which the security validation test is processed. As such, the decision can be made in response to the security test.

Further, in some examples, modification of the AUT can include modifying an outcome of a function of the AUT, for example information returned from the function. The modification can be used to cause the AUT to arrive at a desired path or take the desired path. In one example, the function relates to the security validation test (e.g., CAPTCHA, credit card validation, etc.). In another example, the desired path can relate to passing the security validation test. For example, the desired path can be caused to be taken by the modification instructions 522 regardless of what is returned by the function and/or because what is returned by the function has been modified.

With the above approaches, active modifying behavior can be used to facilitate testing of an application. For example, modification makes it easier for penetration testing tools to find certain types of vulnerabilities without need for solving every problem that lies ahead of the vulnerability. Further, this process can be automated so that manual intervention of the code is unnecessary. As such, the AUT need not be changed. Moreover, correction of relevant parts of the application logic can keep the application under test's logic intact in the eyes of casual users.

What is claimed is:

1. A computing system comprising:
    a server to execute an application under test;
    a computing device to perform a security test on the application under test; and
    a real-time modifier engine to cause the application under test to take a first execution path at a decision point of the application under test regardless of a decision by the application under test at the decision point to take a second execution path in response to the security test, wherein the real-time modifier engine modifies an outcome of a function used by the application under test to determine the decision made by the application under test at the decision point, uses an instrument that monitors an Application Programming Interface (API), and chooses the first execution path in response to a part of the API being called.

2. The computing system of claim 1, wherein the function is a security validation test, and the decision made at the decision point is based on the application under test passing the security validation test.

3. The computing system of claim 1, wherein the real-time modifier engine modifies the outcome of a Completely Automated Public Turing test to tell Computers and Humans Apart (CAPTCHA).

4. The computing system of claim 1, wherein the real-time modifier engine is implemented as part of a Java Virtual Machine.

5. The computing system of claim 1, wherein the real-time modifier engine modifies the outcome of a validation of a credit card number.

6. The computing system of claim 1, wherein the real-time modifier engine modifies the outcome of a validation of an identification number.

7. The computing system of claim 1, wherein the real-time modifier engine is implemented as part of a .NET framework.

8. A non-transitory machine-readable storage medium storing instructions that, when executed by at least one processor of a device, cause the device to:
    execute an application under test;
    perform a security test on the application under test in response to communications received from a computing device;
    cause, by a real-time modifier engine in response to the received communications from the computing device, the application under test to take a first execution path at a decision point of the application under test regardless of a decision by the application under test at the decision point to take a second execution path in response to the security test by modifying a variable used by the application under test;
    modify an outcome of a function used by the application under test to determine the decision made by the application under test at the decision point;
    use an instrument that monitors an Application Programming Interface (API); and
    choose the first execution path in response to a part of the API being called.

9. The non-transitory machine-readable storage medium of claim 8, further comprising instructions that, when executed by the at least one processor, cause the device to cause the application under test to take the first execution path in response to the application under test passing the security validation test.

10. The non-transitory machine-readable storage medium of claim 8, further comprising instructions that, when executed by the at least one processor, cause the device to modify the outcome of a Completely Automated Public Turing test to tell Computers and Humans Apart (CAPTCHA).

11. The non-transitory machine-readable storage medium of claim 8, further comprising instructions that, when executed by the at least one processor, cause the device to modify the outcome of a validation of a credit card number.

12. The non-transitory machine-readable storage medium of claim 8, further comprising instructions that, when executed by the at least one processor, cause the device to modify the outcome of a validation of an identification number.

13. A method comprising:
    executing, on a server, an application under test;
    performing a security test on the application under test in response to a communication at the server from a computing device; and
    causing, by a real-time modifier engine in response to the communication, the application under test to take a first execution path at a decision point of the application under test regardless of a decision by the application under test at the decision point to take a second execution path in response to the security test by modifying code used by the application under test,
    wherein causing the application under test to take the first execution path comprises:
        modifying an outcome of a function used by the application under test to determine the decision made by the application under test at the decision point;
        using an instrument that monitors an Application Programming Interface (API); and
        choosing the first execution path in response to a part of the API being called.

14. The method of claim 13, further comprising:
performing a Completely Automated Public Turing test to tell Computers and Humans Apart (CAPTCHA) security test on the application under test; and
receiving an incorrect response to the CAPTCHA security test;
wherein the first execution path is associated with a correct response to the CAPTCHA security test and the second execution path is associated with the incorrect response to the CAPTCHA security test.

15. The method of claim 14, wherein modifying the code includes modifying an outcome of a function and wherein the function is intended to return a correct response to the CAPTCHA security test.

16. The method of claim 13, wherein performing the security test includes performing a penetration test.

17. The method of claim 13, wherein performing the security test includes performing a unit test.

\* \* \* \* \*